(No Model.)

E. C. STEWART.
COMBINED HEARTH, ASH PAN, AND FENDER.

No. 460,042. Patented Sept. 22, 1891.

WITNESSES:
Fred G. Dieterich
H. J. Robinson

INVENTOR:
Emily C. Stewart
BY Munn & Co.
ATTORNEYS

UNITED STATES PATENT OFFICE.

EMILY CAROLINE STEWART, OF BIRMINGHAM, ALABAMA.

COMBINED HEARTH, ASH-PAN, AND FENDER.

SPECIFICATION forming part of Letters Patent No. 460,042, dated September 22, 1891.

Application filed December 21, 1889. Serial No. 334,589. (No model.)

*To all whom it may concern:*

Be it known that I, EMILY CAROLINE STEWART, a citizen of the United States, residing at Birmingham, county of Jefferson, and State of Alabama, have invented a new and useful Grate-Pan and Fender, of which the following is a specification.

This invention relates to a portable combined hearth, ash-pan, and fender for open fire-places. Open fire-places have been provided with portable or removable heaters and fenders, and the ashes are usually allowed to drop down behind and beneath the portable hearth upon the brick or the hearth, and to remove these ashes the portable hearth must be removed, the ashes taken up with a shovel, and the earthenware hearth swept or cleaned. Ash-pans have also been arranged beneath the grates.

The object of my invention is to combine in one article a portable hearth, ash-pan, and fender, the fender serving also as the handle of the pan.

With these objects in view my invention consists of a receptacle covered at its forward end, forming a hearth, and opened at its rear end to allow ashes to be received therein, and a combined folding handle and fender pivoted to the top of the said receptacle.

My invention consists, further, in certain details of construction and combination of parts, as will fully appear hereinafter.

Figure 1:
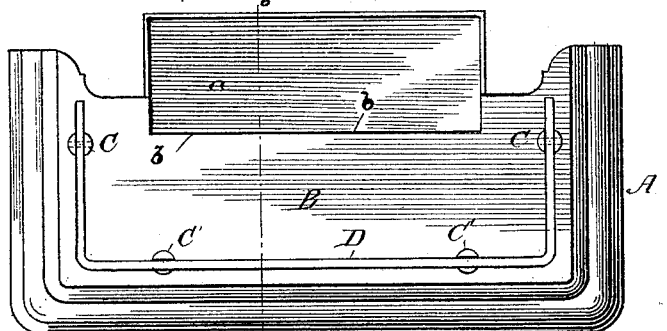
Figure 2:
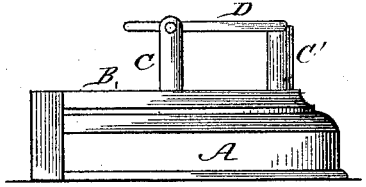
Figure 3:
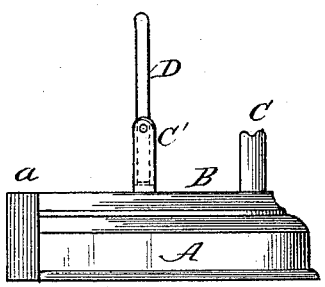
Figure 4:
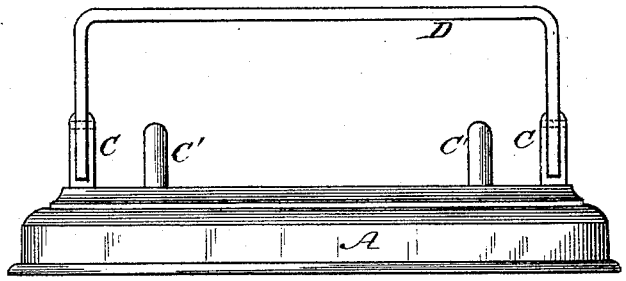
Figure 5:
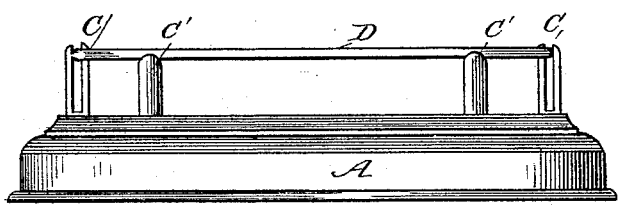
Figure 6:
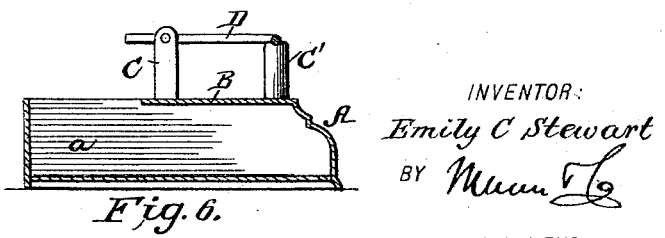

In the drawings forming a part of this specification, Figure 1 is a top plan. Fig. 2 is an end view with the combined handle and fender down. Fig. 3 is a similar view with the combined handle and fender up. Fig. 4 is a front view with the combined handle and fender up, and Fig. 5 is a similar view with the combined handle and fender down. Fig. 6 is a transverse vertical section taken on line 6 6 of Fig. 1.

In the practical embodiment of my invention I employ a receptacle A, essentially rectangular in shape, but provided with a rear extension $a$, which is adapted to fit into the fire-place and rest beneath the open grate, thus forming an ash-pan beneath said grate. A cover or top B is secured upon the receptacle A, forming the portable hearth, said cover or top being cut away at its rear end, as at $b$, forming, with the open extension $a$, an opening sufficiently large to receive the ashes that may drop from the grate. Upright standards C C are secured upon the cover B near the opposite ends of the same, the upper ends of said standards being slotted longitudinally and at right angles to the longitudinal axis of the receptacle A. One or more standards C' are secured upon the cover B near the forward side of the same, the upper ends of said standard or standards being grooved, as shown.

A U-shaped rod or bar D, serving as a combined handle and fender, is pivoted at its opposite ends in the slotted standards C, said handle and fender being adapted to be held in a vertical position and form a handle for the ash-pan, or folded down in a horizontal position to form a fender for the portable hearth, the central portion of the combined handle and fender resting on the standard or standards C', as clearly shown.

In operation the combined hearth, pan, and fender is placed in the fire-place front, the extension entering the fire-place and the combined handle and fender resting in a horizontal position. Any ashes dropping will be caught in the pan, and should the rear part of the pan become filled by tilting the said rear end the ashes will move down to the forward end and be covered by the cover or portable hearth-piece. When the receptacle becomes filled, the combined handle and fender is turned up, producing a handle by means of which the pan can be removed and transported.

Having thus described my invention, what I claim, and desire to secure by Letters Patent, is—

1. The combined hearth, pan, and fender consisting of a receptacle having its forward end covered and a folding handle or bail pivoted upon said cover, substantially as shown and described.

2. A combined hearth, pan, and fender consisting of a receptacle having a rear extension adapted to fit the fire-place, a cover arranged upon the forward portion of the receptacle, and a U-shaped handle or bail pivoted upon the said cover, substantially as shown and described.

3. In a combined hearth, pan, and fender, the combination, with a receptacle, of the cover secured upon the forward portion of said re-